US008495469B2

(12) United States Patent
Bakke et al.

(10) Patent No.: US 8,495,469 B2
(45) Date of Patent: Jul. 23, 2013

(54) IMPLEMENTING ENHANCED IO DATA CONVERSION WITH PROTECTION INFORMATION MODEL INCLUDING PARITY FORMAT OF DATA INTEGRITY FIELDS

(75) Inventors: Brian E. Bakke, Rochester, MN (US); Robert E. Galbraith, Rochester, MN (US); Adrian C. Gerhard, Rochester, MN (US); Daniel F. Moertl, Rochester, MN (US); Rick A. Weckwerth, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 13/108,097

(22) Filed: May 16, 2011

(65) Prior Publication Data

US 2012/0297272 A1 Nov. 22, 2012

(51) Int. Cl.
*G06F 12/00* (2006.01)
*G06F 11/00* (2006.01)
*G11B 5/00* (2006.01)

(52) U.S. Cl.
USPC ........... 714/770; 714/6.22; 714/800; 711/114

(58) Field of Classification Search
USPC ............... 714/6.1, 6.11, 6.12, 6.13, 6.2, 6.21, 714/6.22, 6.24, 746, 752, 758, 763, 769, 714/770, 773, 799, 800, 111, 112, 114
See application file for complete search history.

(56) References Cited

U.S. PATENT DOCUMENTS

| 6,993,705 | B1 * | 1/2006 | MacLellan | 714/800 |
| 7,613,887 | B1 * | 11/2009 | Wong et al. | 711/154 |
| 2005/0044261 | A1 * | 2/2005 | Saxena | 709/236 |
| 2005/0044349 | A1 | 2/2005 | Henry | |
| 2010/0037022 | A1 | 2/2010 | Chou et al. | |
| 2010/0131706 | A1 | 5/2010 | Bean et al. | |
| 2010/0131773 | A1 | 5/2010 | Cherian et al. | |
| 2010/0312960 | A1 | 12/2010 | Bert | |

FOREIGN PATENT DOCUMENTS

WO WO 9625745 A1 8/1996
WO WO 2008013695 A2 1/2008

OTHER PUBLICATIONS

Gopalan Sivathanu et al, "Ensuring data integrity in storage—techniques and applications", Nov. 2005.

* cited by examiner

*Primary Examiner* — Christine Tu
(74) *Attorney, Agent, or Firm* — Joan Pennington

(57) ABSTRACT

A method and controller for implementing enhanced input/output (IO) data conversion with an enhanced protection information model including an enhanced parity format of the data integrity fields (DIF), and a design structure on which the subject controller circuit resides are provided. The controller implements a protection information model including a unique parity data integrity fields (DIF) format. The unique parity DIF format enables corruption detection for RAID parity blocks. The unique parity DIF format includes a predefined size for a protection information model logical block guard cyclic redundancy check (CRC) field and a logical block Reference Tag (RT) field. A plurality of storage devices in a RAID configuration are coupled to the controller, and configured to store data and RAID parity redundancy data, and wherein a strength of RAID parity redundancy data is not reduced when a loss of a single storage device in the plurality of storage devices occurs.

20 Claims, 6 Drawing Sheets

200

LEGACY DATA SECTOR FORMAT
(DATA FORMAT USED PRIOR TO SAS T10 DIF FORMAT OF 528-BYTES)

| HEADER 202 | DATA 204 | PAD (COPY OF CRC32) 206 | LEGACY CRC32 208 |
|---|---|---|---|
| 8-BYTE | 512-BYTE | 4-BYTE | 4-BYTE |

CROC DATA SECTOR FORMAT (SAS T10 DIF FORMAT OF 528-BYTES)

| HEADER 212 | DATA 214 | T10 CRC16 216 | AT-SEQ NUM BE 218 | RT(LBA) 220 |
|---|---|---|---|---|
| 8-BYTE | 512-BYTE | 2-BYTE | 2-BYTE | 4-BYTE |

CROC PARITY SECTOR FORMAT
(DIF FORMAT USED FOR PARITY REDUNDANCY DATA AND METADATA OF 528-BYTES)

| XOR PRODUCT 232 | T10 CRC16 234 | RT(LBA) 236 |
|---|---|---|
| 524-BYTE | 2-BYTE | 2-BYTE |

FIG. 2C

IMPLEMENTING ENHANCED IO DATA CONVERSION WITH PROTECTION INFORMATION MODEL INCLUDING PARITY FORMAT OF DATA INTEGRITY FIELDS

FIELD OF THE INVENTION

The present invention relates generally to the data processing field, and more particularly, relates to a method and controller for implementing enhanced input/output (IO) data conversion with an enhanced protection information model including a special parity format of the data integrity fields (DIF), and a design structure on which the subject controller circuit resides.

DESCRIPTION OF THE RELATED ART

Data integrity is key to a data storage system. It is expected that data written to a storage device will be retrieved with complete accuracy when it is later successfully read. In order to ensure that the data is indeed stored, retrieved, and transferred accurately, storage systems have traditionally relied upon checking of data by parity bits, cyclic redundancy check (CRC), and error correction codes (ECC). However, these methods, while very useful for detection of some types of errors, are woefully inadequate for detection of other types of errors.

For example, should a hard disk drive (HDD) or solid state drive (SSD) mistakenly store a block of data at the incorrect logical block address (LBA) then resulting data corruption which may go completely undetected by parity, cyclic redundancy check (CRC), and error checking code (ECC) which is kept on a data block (or less) granularity.

In order to improve the likelihood of detecting a data integrity problem, the T10 Technical Committee, www.t10.org which develops SCSI storage interface standards, helped create a Protection Information (PI) model. The basic idea of the T10 protection information model is that each block of data will have three data integrity fields (DIF) appended to the data block which can be checked at various points during a write or read operation to detect if the data block becomes corrupt or is being used inappropriately.

The three data integrity fields (8-bytes in total) of the T10 protection information model are as follows: 1) Logical Block Guard (a 2-byte CRC field); 2) Logical Block Application Tag (AT, 2-bytes set by application client, such as a sequence number corresponding to the least significant bytes of a host LBA); and 3) Logical Block Reference Tag (RT, least significant 4-bytes of the LBA for Type 1 protection). The model provides for several different use cases for these fields; Type 0, Type 1, Type 2, and Type 3. The following descriptions assume the use of Type 1 protection by the storage adapter, although it should be understood that other types of protection could be used by the storage adapter.

A need exists for an effective method and controller for implementing enhanced data conversion with an enhanced protection information model including a special parity format of the data integrity fields (DIF). It is desirable to provide such special DIF format that is used when storing non-user data such as RAID parity blocks and metadata.

As used in the following description and claims, the terms controller and controller circuit should be broadly understood to include an input/output (IO) adapter (IOA) and includes an IO RAID adapter connecting various arrangements of a host computer system and peripheral storage 110 devices including hard disk drives, solid state drives, tape drives, compact disk drives, and the like.

SUMMARY OF THE INVENTION

Principal aspects of the present invention are to provide a method and controller for implementing enhanced input/output (IO) data conversion with an enhanced protection information model including a special parity format of the data integrity fields (DIF), and a design structure on which the subject controller circuit resides. Other important aspects of the present invention are to provide such method, controller, and design structure substantially without negative effects and that overcome many of the disadvantages of prior art arrangements.

In brief, a method and controller for implementing enhanced input/output (IO) data conversion with an enhanced protection information model including an a unique parity format of the data integrity fields (DIF), and a design structure on which the subject controller circuit resides are provided. The controller implements a protection information model including a unique parity data integrity fields (DIF) format. The unique parity DIF format enables corruption detection for RAID parity blocks. The unique parity DIF format includes a predefined size for a protection information model logical block guard cyclic redundancy check (CRC) field and a logical block Reference Tag (RT) field. A plurality of storage devices in a RAID configuration are coupled to the controller, and configured to store data and RAID parity redundancy data, and wherein a strength of RAID parity redundancy data is not reduced when a loss of a single storage device in the plurality of storage devices occurs.

In accordance with features of the invention, the parity DIF format includes a 2-byte protection information model logical block guard cyclic redundancy check (CRC) field and a 2-byte logical block Reference Tag (RT) field. The 4-byte parity DIF format provides 4 additional bytes to be used for RAID parity redundancy data, as compared to an 8-byte T10 DIF format for Serial Attach SCSI (SAS).

In accordance with features of the invention, the protection information model including the unique parity data integrity fields (DIF) format includes an XOR product in 524-byte field including RAID parity data XORed with logical block data to recreate data blocks.

In accordance with features of the invention, converting a legacy data format to the protection information model including the parity data integrity fields (DIF) format can be provided with a background device data conversion process, and a foreground device data conversion process.

In accordance with features of the invention, the background and foreground device data conversion process includes reading a set of blocks with protection information model DIF checking disabled, converting the set of blocks with generating DIF fields on existing data, and writing the set of blocks with DIF generation enabled.

BRIEF DESCRIPTION OF THE DRAWINGS

The present invention together with the above and other objects and advantages may best be understood from the following detailed description of the preferred embodiments of the invention illustrated in the drawings, wherein:

FIG. 2A illustrates a legacy data sector format for conversion in accordance with the preferred embodiment;

FIG. 2B illustrates a converged RAID on chip (CROC) data sector format with a Serial Attach SCSI (SAS) T10 DIF format in accordance with the preferred embodiment;

FIG. 2C illustrates a CROC parity DIF sector format in accordance with the preferred embodiment;

DETAILED DESCRIPTION OF THE PREFERRED EMBODIMENTS

Figure 1:
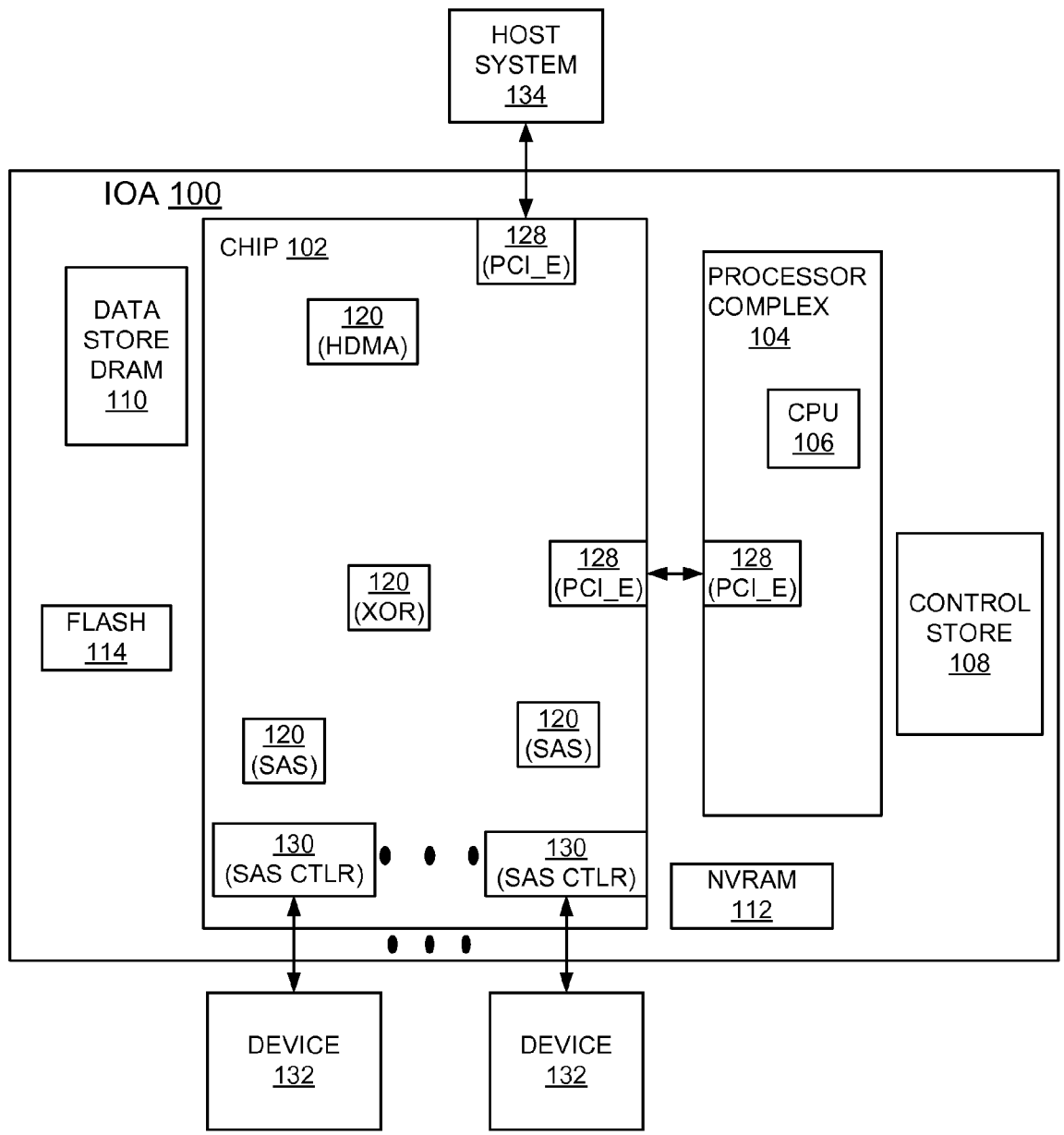
FIG. 1 is a schematic and block diagram illustrating an exemplary system for implementing enhanced data conversion in accordance with the preferred embodiment.

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and controller for implementing storage adapter with enhanced data conversion including an enhanced protection information model including a special parity format of the data integrity fields (DIF), and a design structure on which the subject controller circuit resides are provided.

While the T10 protection information model provided by the T10 Technical Committee addressed the format of the data integrity fields (DIF) well for data blocks which contain user data, the format of the DIF fails to effectively address blocks of data containing parity data, which are often called P parity for RAID-5 or containing ECC syndrome bytes; and are often called P/Q parity for Reed-Solomon based RAID-6.

In accordance with features of the invention, the protection information model including the special parity format of the data integrity fields (DIF) of the present invention protects parity data integrity. The special parity format of the data integrity fields (DIF) of the present invention also is useful when storing non-user data, such as atomic parity update data, and metadata.

While adoption of the T10 PI model can improve data integrity, it can be challenging to adopt the new methods to existing data stored on existing HDDs/SSDs in a customer environment. For example, the prior SAS storage adapters for IBM Power Systems use a legacy 528 byte/block format where the last 8-bytes of each data block contained two copies of a 4-byte CRC.

In accordance with features of the invention, the controller providing data conversion with the protection information model including the special parity format of the data integrity fields (DIF) of the present invention can be attached to existing HDDs/SSDs and is able to convert the trailing 8-bytes of each block to the T10 PI format while maintaining the existing data and allowing the host to continue to perform I/O operations during the conversion process.

In accordance with features of the invention, the method and controller for implementing enhanced data conversion including the protection information model including the special parity format of the data integrity fields (DIF) enable new RAID arrays to be created from HDDs or SSDs which are formatted to contain all zeroed blocks of data. The method and controller of the invention enable new RAID arrays to also be created from HDDs or SSDs which were previously in a RAID array and thus have both data and parity blocks which must be converted to the correct data or parity format as needed for the new RAID array where data and parity blocks are at potentially different LBAs for the new RAID array as compared to the old RAID array.

Having reference now to the drawings, in FIG. 1, there is shown an input/output adapter (IOA) or controller in accordance with the preferred embodiment generally designated by the reference character 100. Controller 100 includes a semiconductor chip 102 coupled to a processor complex 104 including a central processor unit (CPU) 106. Controller 100 includes a control store (CS) 108, such as a dynamic random access memory (DRAM) proximate to the CPU 106 providing control storage and a data store (DS) DRAM 110 providing write cache data storage. Controller includes a non-volatile random access memory (NVRAM) 112, and a flash memory 114.

Semiconductor chip 102 includes a plurality of hardware engines 120, such as, a hardware direct memory access (HDMA) engine 120, an XOR or sum of products (SOP) engine 120, and a Serial Attach SCSI (SAS) engine 120. Semiconductor chip 102 includes a respective Peripheral Component Interconnect Express (PCIe) interface 128 with a PCIe high speed system interconnect between the controller semiconductor chip 102 and the processor complex 104, and a Serial Attach SCSI (SAS) controller 130 with a SAS high speed system interconnect between the controller semiconductor chip 102 and each of a plurality of storage devices 132, such as hard disk drives (HDDs) or spinning drives 132, and solid state drives (SSDs) 132. As shown host system 134 is connected to the controller 100, for example, with a PCIe high speed system interconnect.

FIG. 2A illustrates a legacy data sector format generally designated by reference character 200 for conversion in accordance with the preferred embodiment. The legacy data sector format 200 used by, for example, SAS storage adapters for IBM Power Systems is a standard or legacy 528 byte/block format with an 8-byte Header 202 and 512-byte data field 204 where the last 8-bytes of each data block contained two copies of a legacy 4-byte CRC or CRC32, 206, 208.

FIG. 2B illustrates a converged RAID on chip (CROC) data sector format of 528-bytes or a SAS T10 DIF format generally designated by reference character 210 in accordance with the preferred embodiment. The SAS T10 format 210 includes an 8-byte Header 212 and 512-byte data field 214, followed by DIF fields of a Logical Block Guard or T10 CRC16 field 216 (a 2-byte CRC field); a Logical Block Application Tag field 218 (AT, 2-bytes set by application client, such as a sequence number corresponding to the least significant bytes of a host LBA); and a Logical Block Reference Tag field 220 (RT, least significant 4-bytes of the LBA for Type 1 protection).

FIG. 2C illustrates a novel CROC parity DIF data sector format of 528-bytes generally designated by reference character 230 in accordance with the preferred embodiment. The unique CROC parity T10 DIF data sector format 230 includes an XOR product 232 (a 524-byte field), a Logical Block Guard or T10 CRC16 field 234 (a 2-byte CRC field), and a Logical Block Reference Tag field 236 (RT, a 2-byte field). It is to be understood that the XOR product 232 contains either the P parity for RAID-5 or the P/Q parity for RAID-6.

In accordance with features of the invention, the parity DIF data sector format 230 allows the Logical Block Guard (CRC) and Logical Block Application Tag (AT) to be recreated using RAID while still providing good corruption detection for the parity itself. In the parity T10 DIF data sector format 230, this is enabled by reducing the DIF for a parity block to only 4-bytes as compared to 8-bytes for a data block as shown in the SAS T10 DIF format 210 in FIG. 2B. Instead of the CRC/AT/RT fields 216, 218, 220 of the SAS T10 DIF format, the parity block contains only the T10 CRC16 field 234 (2-bytes CRC) and a reduced 2-byte RT field 236. This frees up 4 bytes for use in the preceding XOR product field 232 that are used as traditional P parity or P/Q parity which is used with RAID to recreate the CRC and AT fields for data blocks. Because P parity or P/Q parity blocks are never transferred to a host application, an AT field is not needed in the parity block of the parity DIF data sector format 230.

In accordance with features of the invention, the parity T10 DIF format 230 is also advantageously used with other types of adapter non-user data, such as atomic parity update data and metadata, since the CRC/RT advantageously is generated by hardware automatically as the data is transferred from the controller 100 to an HDD or SSD 132.

Figure 3:
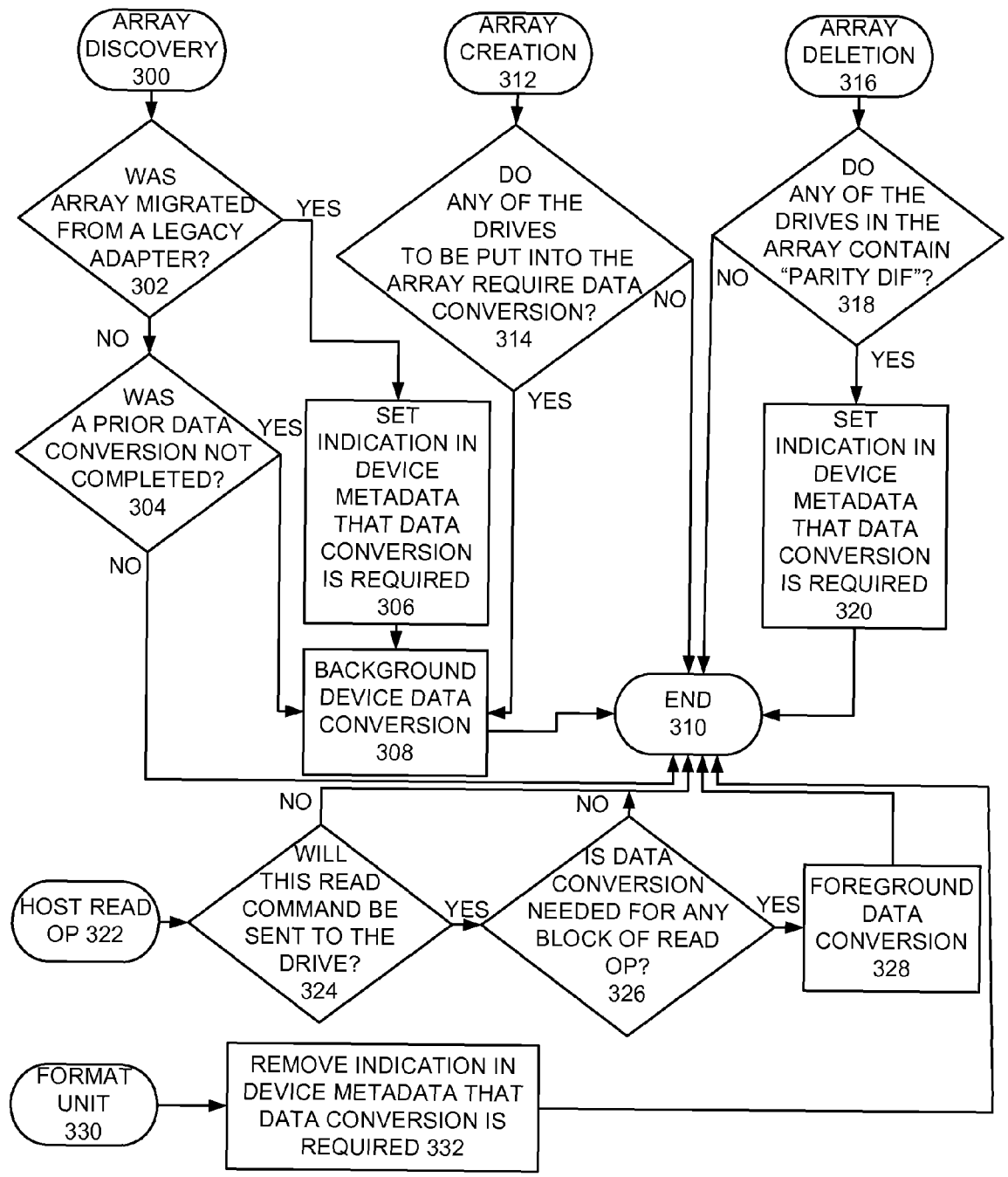
FIGS. 3, 4, and 5 are flow charts illustrating exemplary steps for implementing enhanced data conversion in accordance with the preferred embodiment.
Figure 4:
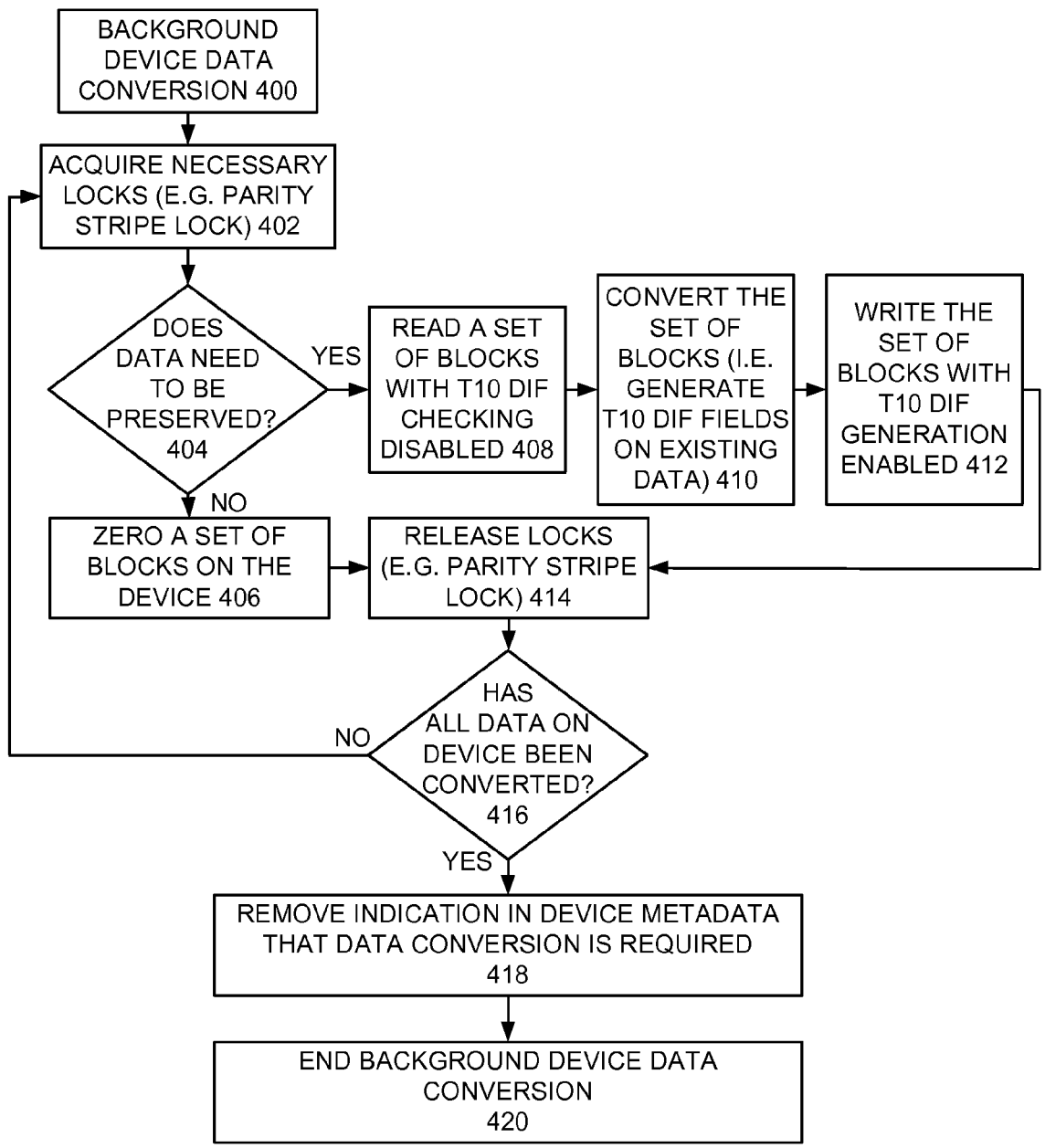
Figure 5:
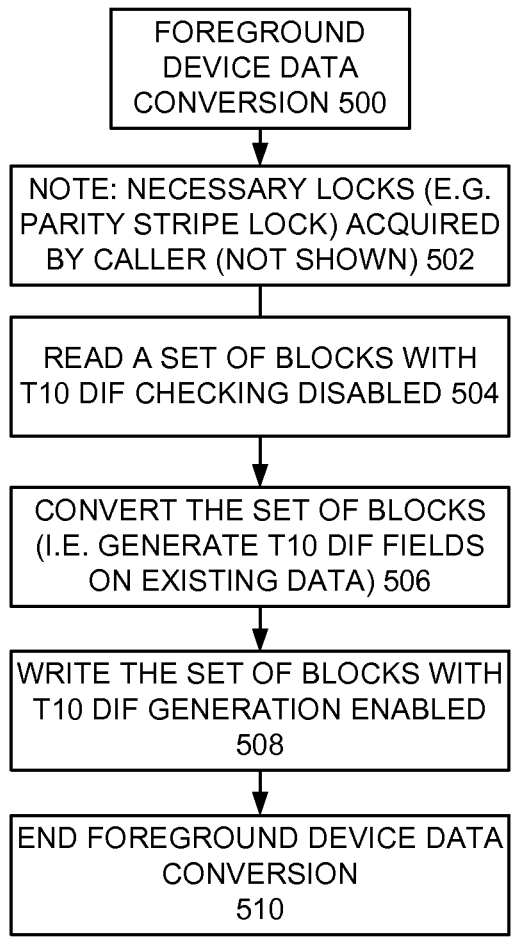

Referring to FIGS. 3, 4, and 5 there are shown flow charts illustrating exemplary steps for implementing enhanced data conversion in accordance with the preferred embodiment. The flow charts of FIGS. 3, 4, and 5 illustrate an overall process related to RAID array discovery, array creation, array deletion, device formatting to zeros, and host reads. The invention provides for conversion of devices with the data/parity block of a legacy format, such as the illustrated legacy format 200 to the proper T10 DIF format 210 needed for a RAID array of devices 132, using a conversion process either in the background or in the foreground concurrent with processing host reads/writes. It is assumed that a RAID array will not be considered protected, that is parity blocks will not be in synchronization with the data blocks in a parity stripe while the T10 DIF conversion is taking place, and therefore the RAID arrays can not have any failed members. Host write operations occur normally during the T10 DIF conversion.

Referring to FIG. 3, the operations begin as indicated at a block 300 for RAID array discovery. Checking whether the RAID array migrated from a legacy adapter is performed as indicated at a decision block 302. When determined that the RAID array was not migrated from a legacy adapter, checking if a prior data conversion was not completed as indicated at a decision block 304. When determined that the RAID array migrated from a legacy adapter, then an indication in the device metadata is set indicating that data conversion is required as indicated at a block 306. When determined that a prior data conversion was not completed at decision block 304, and after the device metadata indication is set, then a background device data conversion process is performed as indicated at a block 308. An example background device data conversion process is illustrated and described with respect to FIG. 4. After the background device data conversion process is completed, the operations end as indicated at a block 310.

As indicated at a block 312, operations begin for RAID array creation. Checking whether any of the drives to be put into the RAID array require data conversion is performed as indicated at a decision block 314. When any of the drives to be put into the RAID array require data conversion, then the background device data conversion process is performed at block 308.

As indicated at a block 316, operations begin for RAID array deletion. Checking whether any of the drives in the RAID array contain parity DIF is performed as indicated at a decision block 318. If not, the operations end at block 310. When any of the drives in the RAID array contain parity DIF, then an indication in the device metadata is set indicating that data conversion is required as indicated at a block 320. Then the operations end at block 310.

As indicated at a block 322, operations begin for a host Read op. Checking whether this read command will be sent to the drive is performed as indicated at a decision block 324. When this read command will be sent to the drive, checking if data conversion is needed for any block of the Read op is performed as indicated at a decision block 326. When data conversion is needed for any block of the Read op, then a foreground data conversion is performed as indicated at a block 328. The operations end at block 310. The foreground data conversion process is illustrated and described with respect to FIG. 5.

As indicated at a block 330, operations begin for a format unit where all data on a drive is zeroed. The indication in the device metadata is removed indicating that data conversion is not required as indicated at a block 332. Then the operations end at block 310.

Data and parity blocks which are all zeroed, for example, all 528 bytes of the block are zero, are handled as follows. A read of the data block from a storage device 132 (HDD/SSD) to the IOA controller 100 will result in no T10 DIF error being reported when the storage device is itself operating as Type 0 for the T10 PI model. This results as the CRC will be considered correct, which it is, since zero CRC is correct for zero data; the AT will be considered correct from the device since zero is the initial value, but may later result in a error if transferred to the host and is not expected; and the RT field will be considered correct, which would not normally be so, except for particular LBAs such as zero.

Data and parity blocks which are all zeroed except for the last 8-bytes which are bytes of 0xFF, for example, 520 bytes of the block are zero and the last 8 bytes are 0xFF) are handled as follows: Note that this is how a storage device operating as Type 1 for the T10 PI model would initialize the blocks as the result of performing Format Unit command. A read of the data block from a storage device (HDD/SSD) to the storage adapter will result in no T10 DIF error being reported when the storage device is itself operating as Type 1 for the T10 PI model. This results as the CRC will be considered correct, which would not normally be so; the AT would not be checked when equal to 0xFFFF, but may later result in a error if transferred to the host and is not expected; and the RT field will be considered correct, which would not normally be so, except for particular LBAs such as 0xFFFFFFFFFFFFFFFF. As the data is transferred into the IOA controller 100, the last 8-bytes, which were bytes of 0xFF, will be changed to bytes of zero.

This allows for devices 132 which are zeroed by commands such as Format Unit command to be placed into RAID arrays without any further T10 DIF conversion being performed. Also, no synchronization of data/parity blocks in the parity stripes of a RAID array is required when all devices used to create the RAID array are zeroed.

Referring to FIG. 4, the operations begin as indicated at a block 400 for the background device data conversion. Necessary locks are acquired, for example, a parity stripe lock is acquired as indicated at a block 402. Checking whether the data needs to be preserved as indicated at a decision block 404. When the data does not need to be preserved, then a set of blocks on the device are zeroed as indicated at a block 406. When the data needs to be preserved, then a set of blocks is read with T10 DIF checking disabled as indicated at a block 408. The set of blocks is converted, that is T10 DIF fields on existing data are generated, as indicated at a block 410. Then set of blocks is written with the T10 DIF generation enabled as indicated at a block 412. The locks, such as the parity stripe lock, are released as indicated at a block 414.

Next checking if all data on the device has been converted is performed as indicated at a decision block 416. When all data on the device has not been converted, then the operations return to block 402 acquiring necessary locks and continue as before. Otherwise when all data on the device has been converted, then the indication in the device metadata is removed indicating that data conversion is not required as indicated at a block 418. Then the operations end as indicated at a block 420.

Referring to FIG. 5, the operations begin as indicated at a block 500 for the foreground device data conversion. As indicated at a block 502, note that necessary locks, for example, a parity stripe lock acquired by caller (not shown). Then a set of blocks is read with T10 DIF checking disabled as indicated at a block 504. The set of blocks is converted, that is T10 DIF fields on existing data are generated, as indicated at a block 506. Then set of blocks is written with the T10 DIF generation enabled as indicated at a block 4508. Then the foreground device data conversion operations end as indicated at a block 510.

Figure 6:
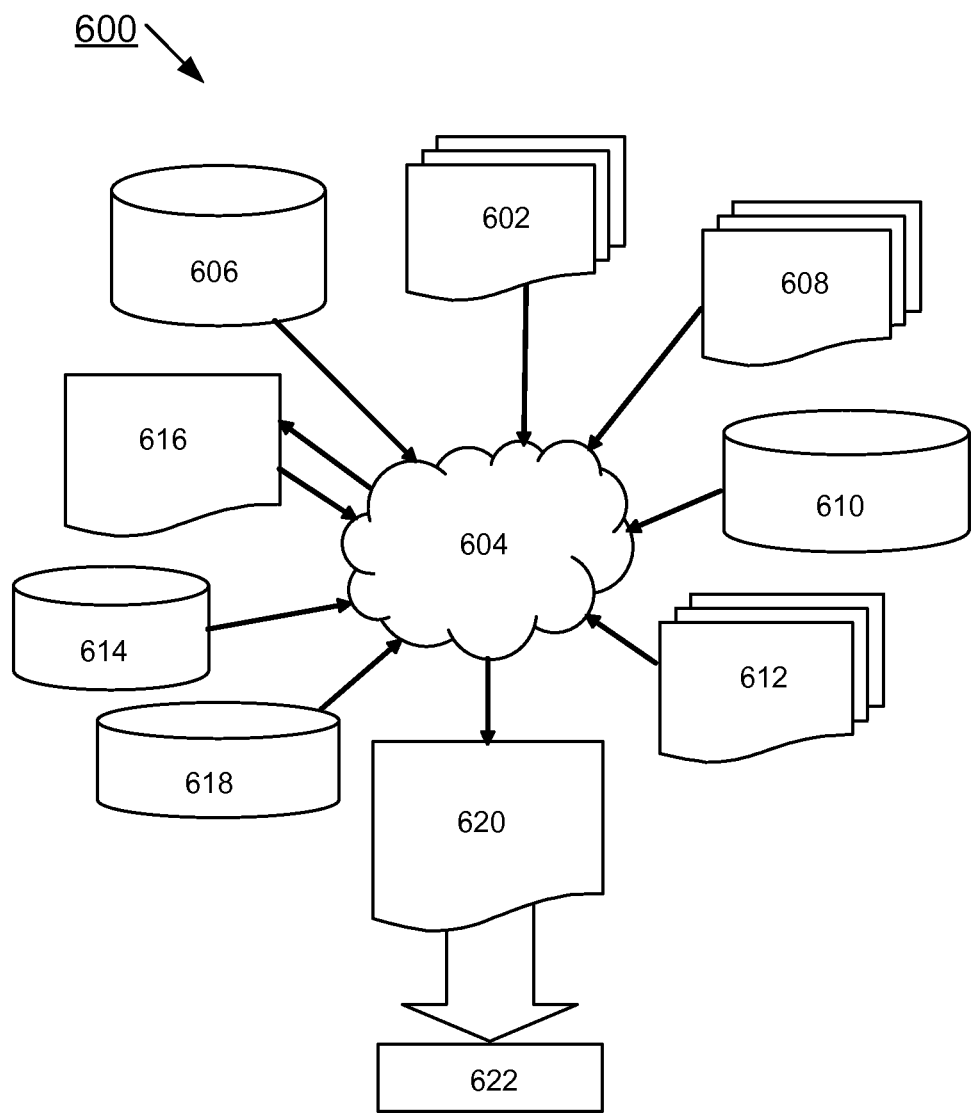
FIG. 6 is a flow diagram of a design process used in semiconductor design, manufacturing, and/or test.

FIG. 6 shows a block diagram of an example design flow 600. Design flow 600 may vary depending on the type of IC being designed. For example, a design flow 600 for building an application specific IC (ASIC) may differ from a design flow 600 for designing a standard component. Design structure 602 is preferably an input to a design process 604 and may come from an IP provider, a core developer, or other design company or may be generated by the operator of the design flow, or from other sources. Design structure 602 comprises circuit 100 in the form of schematics or HDL, a hardware-description language, for example, Verilog, VHDL, C, and the like. Design structure 602 may be contained on one or more machine readable medium. For example, design structure 602 may be a text file or a graphical representation of circuit 100. Design process 604 preferably synthesizes, or translates, circuit 100 into a netlist 606, where netlist 606 is, for example, a list of wires, transistors, logic gates, control circuits, I/O, models, etc. that describes the connections to other elements and circuits in an integrated circuit design and recorded on at least one of machine readable medium. This may be an iterative process in which netlist 606 is resynthesized one or more times depending on design specifications and parameters for the circuit.

Design process 604 may include using a variety of inputs; for example, inputs from library elements 608 which may house a set of commonly used elements, circuits, and devices, including models, layouts, and symbolic representations, for a given manufacturing technology, such as different technology nodes, 32 nm, 45 nm, 90 nm, and the like, design specifications 610, characterization data 612, verification data 614, design rules 616, and test data files 618, which may include test patterns and other testing information. Design process 604 may further include, for example, standard circuit design processes such as timing analysis, verification, design rule checking, place and route operations, and the like. One of ordinary skill in the art of integrated circuit design can appreciate the extent of possible electronic design automation tools and applications used in design process 604 without deviating from the scope and spirit of the invention. The design structure of the invention is not limited to any specific design flow.

Design process 604 preferably translates an embodiment of the invention as shown in FIGS. 1, 2A, 2B, 2C, 3, 4, 5, along with any additional integrated circuit design or data (if applicable), into a second design structure 620. Design structure 620 resides on a storage medium in a data format used for the exchange of layout data of integrated circuits, for example, information stored in a GDSII (GDS2), GL1, OASIS, or any other suitable format for storing such design structures. Design structure 620 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2A, 2B, 2C, 3, 4, 5. Design structure 620 may then proceed to a stage 622 where, for example, design structure 620 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A data storage system comprising:
   a controller for implementing enhanced input/output (IO) RAID operations with a protection information model;
   said protection information model including a unique parity data integrity fields (DIF) format; said unique parity DIF format configured to enable corruption detection for RAID parity blocks;
   said unique parity DIF format including a predefined size for a protection information model logical block guard cyclic redundancy check (CRC) field and a logical block Reference Tag (RT) field; and
   a plurality of storage devices in a RAID configuration coupled to said controller, and configured to store data and RAID parity redundancy data, and wherein a strength of RAID parity redundancy data is not reduced when a loss of a single storage device in the plurality of storage devices occurs.

2. The data storage system as recited in claim 1 wherein said parity DIF format includes a 2-byte protection information model logical block guard cyclic redundancy check (CRC) field and a 2-byte logical block Reference Tag (RT) field.

3. The data storage system as recited in claim 2 wherein said 4-byte parity DIF format provides 4 additional bytes to be used for RAID parity redundancy data.

4. The data storage system as recited in claim 2 wherein said protection information model includes a 524-byte XOR product field for said RAID parity redundancy data XORed with logical block data.

5. The data storage system as recited in claim 4 wherein said 524-byte XOR product field is used to recreate said cyclic redundancy check (CRC).

6. The data storage system as recited in claim 4 wherein said 524-byte XOR product field is used to recreate a logical block Application Tag (AT).

7. The data storage system as recited in claim 1 includes said controller converting a legacy data format to the protection information model including the parity data integrity fields (DIF) format is provided with a background device data conversion process, and a foreground device data conversion process.

8. The data storage system as recited in claim 7 wherein said background device data conversion process, and said foreground device data conversion process includes said controller reading a set of blocks with protection information model DIF checking disabled, converting the set of blocks with generating DIF fields on existing data, and writing the set of blocks with DIF generation enabled.

9. The data storage system as recited in claim 1 includes said controller zeroing all data and RAID parity redundancy data, and removing an indication in device metadata that data conversion is required.

10. The data storage system as recited in claim 1 includes said parity DIF format used with non-user data including parity update data and metadata.

11. A method for implementing data and RAID parity redundancy data integrity in a data storage system comprising:
providing a controller for implementing enhanced input/output (IO) RAID operations with a protection information model;
providing said protection information model with a unique parity data integrity fields (DIF) format; said unique parity DIF format configured to enable corruption detection for RAID parity blocks;
providing said unique parity DIF format including a predefined size for a protection information model logical block guard cyclic redundancy check (CRC) field and a logical block Reference Tag (RT) field; and
providing a plurality of storage devices in a RAID configuration coupled to said controller, and configured to store data and RAID parity redundancy data, and wherein a strength of RAID parity redundancy data is not reduced when a loss of a single storage device in the plurality of storage devices occurs.

12. The method as recited in claim 11 wherein providing said unique parity DIF format including a predefined size includes providing a 2-byte protection information model logical block guard cyclic redundancy check (CRC) field and providing a 2-byte logical block Reference Tag (RT) field.

13. The method as recited in claim 12 wherein providing said protection information model with said unique parity data integrity fields (DIF) format includes providing a 524-byte XOR product field for said RAID parity redundancy data XORed with logical block data.

14. The method as recited in claim 11 includes said controller converting a legacy data format to the protection information model including the parity data integrity fields (DIF) format, using a background device data conversion process, and a foreground device data conversion process.

15. The method as recited in claim 14 wherein said background device data conversion process, and said foreground device data conversion process includes said controller reading a set of blocks with protection information model DIF checking disabled, converting the set of blocks with generating DIF fields on existing data, and writing the set of blocks with DIF generation enabled.

16. The method as recited in claim 11 includes said controller zeroing all data and RAID parity redundancy data, and removing an indication in device metadata that data conversion is required.

17. A design structure embodied in a machine readable medium used in a design process, the design structure comprising:
a controller circuit tangibly embodied in the machine readable medium used in the design process, said controller circuit for implementing enhanced input/output (IO) RAID operations with a protection information model in a data storage system, said controller circuit comprising:
said protection information model including a unique parity data integrity fields (DIF) format; said unique parity DIF format configured to enable corruption detection for RAID parity blocks;
said unique parity DIF format including a predefined size for a protection information model logical block guard cyclic redundancy check (CRC) field and a logical block Reference Tag (RT) field; and
a plurality of storage devices in a RAID configuration coupled to said controller, and configured to store data and RAID parity redundancy data, and wherein a strength of RAID parity redundancy data is not reduced when a loss of a single storage device in the plurality of storage devices occurs, wherein the design structure, when read and used in the manufacture of a semiconductor chip produces a chip comprising said controller circuit.

18. The design structure of claim 17, wherein the design structure comprises a netlist, which describes said controller circuit.

19. The design structure of claim 17, wherein the design structure resides on storage medium as a data format used for the exchange of layout data of integrated circuits.

20. The design structure of claim 17, wherein the design structure includes at least one of test data files, characterization data, verification data, or design specifications.

* * * * *